United States Patent [19]

Muzzi et al.

[11] Patent Number: 5,662,451
[45] Date of Patent: Sep. 2, 1997

[54] GAME HOIST

[75] Inventors: Vincent Muzzi, Shaw; Joe Muzzi, Jr., Greenville, both of Miss.

[73] Assignee: Pa-Paw's, LLC, Greenville, Miss.

[21] Appl. No.: 665,382

[22] Filed: Jun. 18, 1996

Related U.S. Application Data

[60] Provisional application No. 60/014,052, Mar. 25, 1996.
[51] Int. Cl.⁶ ........................................................ B60P 1/00
[52] U.S. Cl. ..................... 414/540; 212/180; 212/302; 212/306; 414/543; 414/462; 254/4 R; 280/763.1
[58] Field of Search ........................... 414/539, 540, 414/541, 542, 543, 571, 560, 592, 718, 460, 462; 254/4 R, 4 B; 280/763.1; 212/175, 176, 180, 294, 301, 302, 306

[56] References Cited

U.S. PATENT DOCUMENTS

| | | | |
|---|---|---|---|
| 2,315,873 | 4/1943 | Richards . | |
| 2,496,401 | 2/1950 | McKinney . | |
| 2,661,854 | 12/1953 | Adams | 414/543 |
| 3,804,263 | 4/1974 | Castonguay . | |
| 3,952,893 | 4/1976 | Kolesar . | |
| 4,069,922 | 1/1978 | Hawkins | 414/543 X |
| 4,419,038 | 12/1983 | Pendergraft . | |
| 4,508,233 | 4/1985 | Helms | 414/543 X |
| 4,640,658 | 2/1987 | Webb, Jr. | 414/462 |
| 4,806,063 | 2/1989 | York . | |
| 4,881,864 | 11/1989 | Amato | 212/180 X |
| 4,961,604 | 10/1990 | Kisner | 414/540 X |
| 4,979,865 | 12/1990 | Strickland . | |
| 5,395,284 | 3/1995 | Frisk . | |
| 5,419,672 | 5/1995 | Poe . | |
| 5,431,526 | 7/1995 | Peterson et al. | 414/540 X |
| 5,445,487 | 8/1995 | Koscinski, Jr. . | |
| 5,540,537 | 7/1996 | Welch | 414/462 |

FOREIGN PATENT DOCUMENTS

| | | | |
|---|---|---|---|
| 1156614 | 11/1983 | Canada . | |
| 425733 | 5/1991 | European Pat. Off. | 212/180 |
| 384386 | 2/1965 | Switzerland . | |
| 657326 | 9/1951 | United Kingdom . | |

*Primary Examiner*—Frank E. Werner
*Attorney, Agent, or Firm*—Richard C. Litman

[57] ABSTRACT

A hoist for lifting or hanging game animals. The hoist is particularly adapted for attachment to an ATV. The hoist includes a horizontal boom attached to a vertical support shaft. The vertical support shaft is telescoping to allow the height of the boom to be varied. The hoist is attached to the ATV by a base which allows the hoist to be supported in a vertical position for lifting game, and in a horizontal position for travelling. A bracing leg is also provided to prevent the ATV from tipping when heavy weights are being lifted using the hoist.

7 Claims, 10 Drawing Sheets

GAME HOIST

CROSS-REFERENCE TO RELATED APPLICATIONS

This application is based on Provisional patent application Ser. No. 60/014,052, filed on Mar. 25, 1996.

BACKGROUND OF THE INVENTION

1. Field of the Invention

The present invention relates to a hoist that can used to raise and/or hang game animals. The hoist is mountable to an all terrain vehicle.

2. Description of the Prior Art

When hunters harvest game, in order to prevent the meat from spoiling, they immediately field dress, i.e. gut, the game. Then hunters hang the game to allow the animal's body cavity to drain and the carcass to cool. Normally, a gambrel and some rope is used to hang the carcass from a convenient tree. However, when hunting big game in brush, scrub land, or swampy areas, a convenient tree that can support the weight of the big game animal may not be available.

For the above reasons, hoists that attach to the hunter's vehicle have been proposed in the prior art. However, the prior art hoists are adapted for use with dual purpose vehicles that must be capable of travelling on paved roads as well as travelling off road. Such vehicles have limited mobility and must be left a considerable distance from the actual site where the game is harvested. For this reason, the field dressed game must be dragged for a considerable distance through rough terrain, which is obviously quite a physical burden on the hunter. Also dragging the animal can lead to contamination of the meat and damage to the hide. Also the time required for dragging the animal delays the cooling of the carcass, which can lead to spoilage. Therefore, it would be desirable for hunters to have a game hoist which is available at the actual hunting site. The hoist of the present invention has been designed to be easily transportable by and mountable to an all terrain vehicle (ATV). ATVs are highly mobile vehicles that can transport the hunter to the very site where game is harvested. In recent years, ATVs have come into wide spread use by hunters and other outdoor enthusiasts. Therefore, the hoist of the present invention, in combination with the widely available ATV, can bring about the realization of a game hoist that is readily available at the site where game is harvested. In addition to hanging game, the game hoist of the present invention can also aid the hunter in lifting the heavy big game animal onto the cargo rack of the ATV.

U.S. Pat. No. 2,315,873, issued to Philip Richards on Apr. 6, 1943, shows a folding hoist mounted on a wheeled cart. Richards does not show a base for attachment to an ATV, having two shaft sections that are fixed relative to a support plate with the two shaft sections being perpendicular to one another.

U.S. Pat. No. 2,496,401, issued to Walter McKinney on Feb. 7, 1950, shows a truck mounted swivelling crane. McKinney does not show a base for attachment to an ATV, having two shaft sections that are fixed relative to a support plate with the two shaft sections being perpendicular to one another.

U.S. Pat. No. 3,804,263, issued to Roger Castonguay on Apr. 16, 1974, shows a portable hoist mounted in the open trunk of an automobile. Castonguay does not show a base for attachment to an ATV, having two shaft sections that are fixed relative to a support plate with the two shaft sections being perpendicular to one another.

U.S. Pat. No. 3,952,893, issued to Joseph J. Kolesar on Apr. 27, 1976, shows a light weight hoist mounted to the bumper of an automobile. Kolesar does not show a base for attachment to an ATV, having two shaft sections that are fixed relative to a support plate with the two shaft sections being perpendicular to one another.

U.S. Pat. No. 4,419,038, issued to Billy D. Pendergraft on Dec. 6, 1983, shows a folding hoist mounted below the tailgate of a pickup truck. Pendergraft does not show a base for attachment to an ATV, having two shaft sections that are fixed relative to a support plate with the two shaft sections being perpendicular to one another.

U.S. Pat. No. 4,806,063, issued to W. Clifton York on Feb. 21, 1989, shows a portable wild game hoist that can be mounted to the bumper and fender of a four wheel drive passenger vehicle. York does not show a base for attachment to an ATV, having two shaft sections that are fixed relative to a support plate with the two shaft sections being perpendicular to one another.

U.S. Pat. No. 4,979,865, issued to Jerome R. Strickland on Dec. 25, 1990, shows a hoist mounted to the bed of a pickup truck. Strickland does not show a base for attachment to an ATV, having two shaft sections that are fixed relative to a support plate with the two shaft sections being perpendicular to one another.

U.S. Pat. No. 5,395,284, issued to Mark D. Frisk on Mar. 7, 1995, shows a hoist for big game designed to be hooked to a tree. Frisk does not show a base for attachment to an ATV, having two shaft sections that are fixed relative to a support plate with the two shaft sections being perpendicular to one another.

U.S. Pat. No. 5,419,672, issued to Jimmy Poe on May 30, 1995, shows a hoist mounted to the tailgate of a pickup truck. Poe does not show a base for attachment to an ATV, having two shaft sections that are fixed relative to a support plate with the two shaft sections being perpendicular to one another.

U.S. Pat. No. 5,445,487, issued to Stanley Koscinski, Jr. on Aug. 29, 1995, shows a hoist with a telescoping boom that can be mounted to a variety of support structures. Koscinski, Jr. does not show a base for attachment to an ATV, having two shaft sections that are fixed relative to a support plate with the two shaft sections being perpendicular to one another.

United Kingdom Patent Document Number 657,326, by Sars Erik Peterson dated Sep. 19, 1951, shows a hoist mounted to a truck bed. U.K. Patent Document '326 does not show a base for attachment to an ATV, having two shaft sections that are fixed relative to a support plate with the two shaft sections being perpendicular to one another.

Swiss Patent Document Number 384,386, by Reneé Salamin dated Feb. 15, 1965, shows a hoist mounted to the roof cargo rack of an automobile. Swiss document '386 does not show a base for attachment to an ATV, having two shaft sections that are fixed relative to a support plate with the two shaft sections being perpendicular to one another.

Canadian Patent Number 1,156,614, Granted to Robert N. Armstrong on Nov. 8, 1983, shows a folding hoist mounted below the tailgate of a pickup truck. Canadian Patent '614 does not show a base for attachment to an ATV, having two shaft sections that are fixed relative to a support plate with the two shaft sections being perpendicular to one another.

None of the above inventions and patents, taken either singly or in combination, is seen to describe the instant invention as claimed.

SUMMARY OF THE INVENTION

The present invention is directed to a hoist for lifting and/or hanging game animals that have been field dressed. The hoist has a two piece vertical support shaft with an upper portion that telescopes within a lower portion thus allowing the height of the hoist to be varied. A horizontal boom is fixed to the top of the upper portion of the vertical support shaft. A brace extends between the upper portion of the vertical support shaft and the horizontal boom to increase the load bearing capacity of the horizontal boom. A pair of pulleys are supported by the horizontal boom and the brace, one located at the free end of the horizontal boom and one attached to the brace. A manually operated winch is attached to the lower portion of the vertical support shaft. A supply of cable is wound around the spool of the winch. The cable is routed around the pair of pulleys, and at the free end of the cable a hook is provided.

The hoist is attached to an all terrain vehicle (ATV) by a base attached to the cargo rack of the ATV. The base includes vertical and horizontal shaft sections into which the lower portion of the vertical support shaft can fit. The lower portion of the vertical support shaft is positioned in the vertical shaft section when the hoist of the present invention is being used to hang or lift an animal carcass. The lower portion of the vertical support shaft is positioned in the horizontal shaft section when the hoist of the present invention is being stowed for travelling.

The invention also includes a bracing leg which is secured to the horizontal shaft section of the base, when the hoist is being used to lift a heavyweight. The bracing leg extends to the ground and prevents the ATV from tipping over when a very heavyweight is being lifted by the hoist.

Accordingly, it is the principal object of the present invention to provide a hoist for hanging or lifting animal carcasses in the field.

It is a further object of the present invention to provide a hoist for hanging or lifting game animals which can be conveniently carried on an ATV.

Still another object of the present invention is to provide a hoist for hanging or lifting game that can be varied in height.

Still another object of the present invention is to provide a hoist for hanging or lifting game that is supported by an ATV when in use.

Yet another object of the present invention is to provide a bracing leg that prevents an ATV from tipping over when a hoist attached to the ATV is used for lifting a heavy weight.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Referring to FIGS. 1–6, the present invention is directed to a hoist 10 for lifting and/or hanging game animals that have been field dressed. The hoist 10 has a two piece vertical support shaft 12 with an upper portion 14 that telescopes within a lower portion 16 thus allowing the height of the hoist 10 to be varied. A horizontal boom 18 is fixed to the top of the upper portion 14 of the vertical support shaft 12. A brace 20 extends between the upper portion 14 of the vertical support shaft 12 and the horizontal boom 18 to increase the load bearing capacity of the horizontal boom. A pair of pulleys 22 and 24 are supported by the horizontal boom structure formed by the horizontal boom 18 and the brace 20. The pulley 22 is located at the free end of the horizontal boom and pulley 24 is attached to the brace 20 near the vertical support shaft 12.

Figure 2:
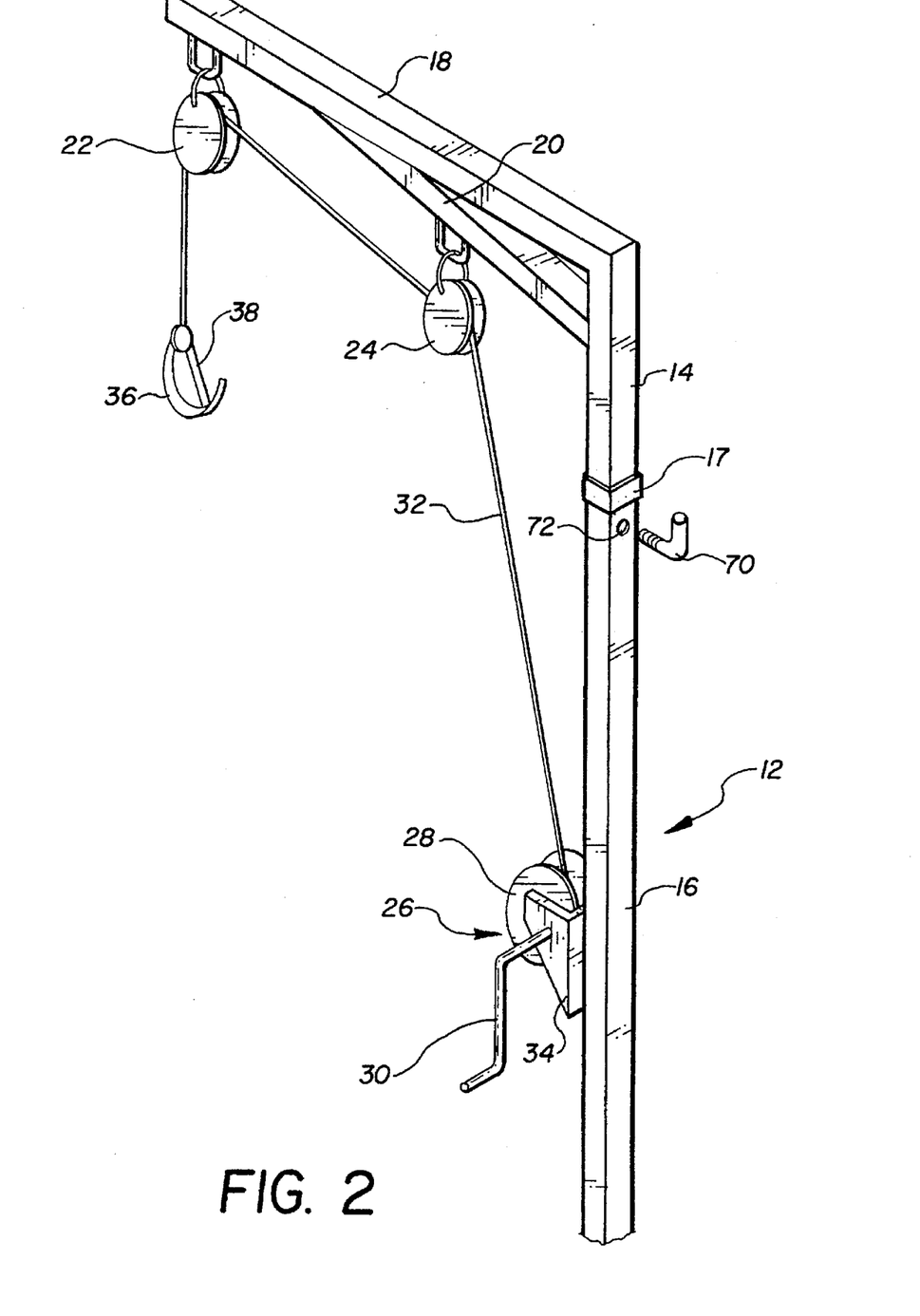
FIG. 2 is a fragmentary view showing the horizontal boom, winch, and pulleys of the hoist of the present invention.

A manually operated winch 26 is attached at about the middle of the lower portion 16 of the vertical support shaft 12. The winch 26 is of a standard type with a spool rotated by the hand crank 30. A supply of cable 32 is wound around the spool 28 of the winch 26. The spool 28 is rotatably supported by the bracket 34 which is attached to the lower portion 16 of the vertical support shaft 12. A standard type ratchet and pawl mechanism prevents the spool 28 from rotating uncontrollably. A power operated winch may be used with the present invention if desired. The cable 32 is routed around the pair of pulleys 22 and 24, and at the free end of the cable a hook 36 is provided. The hook 36 preferably has a safety latch 38.

Figure 1:
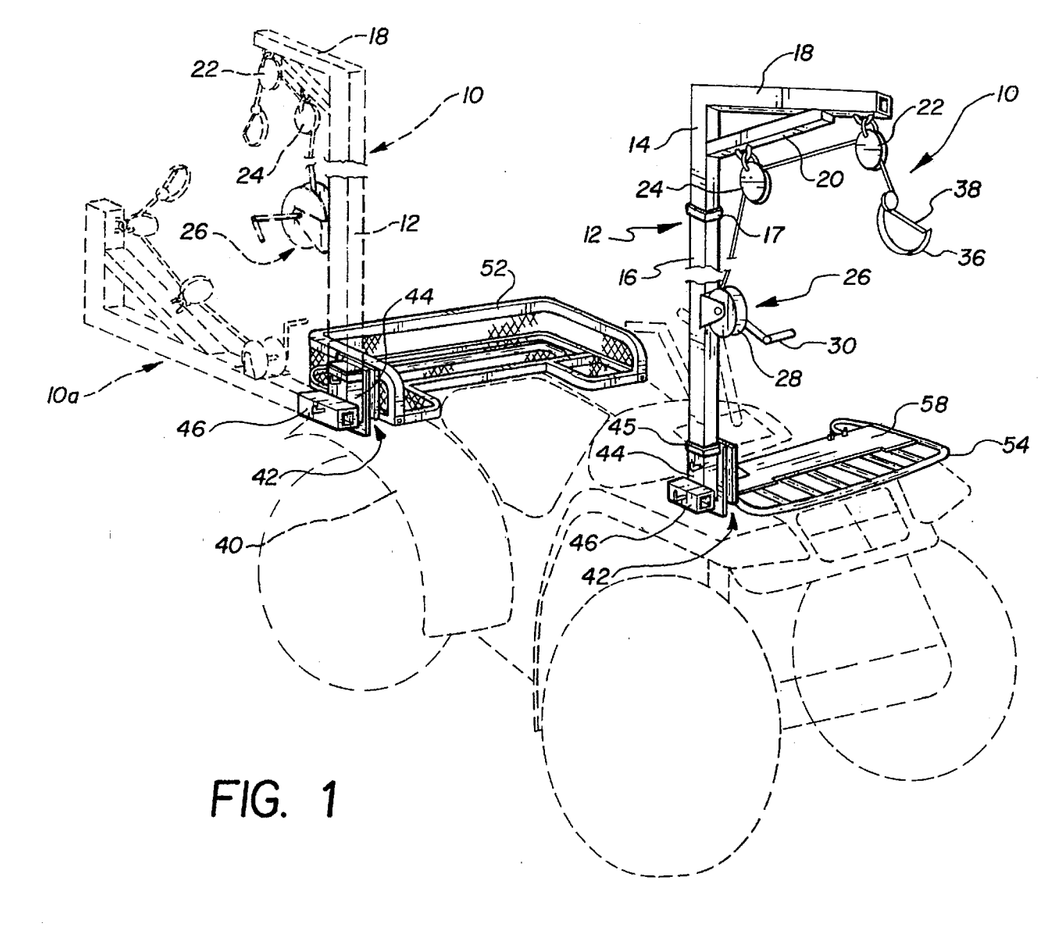
FIG. 1 is an environmental view showing the hoist of the present invention attached to an ATV in various positions.
Figure 3:
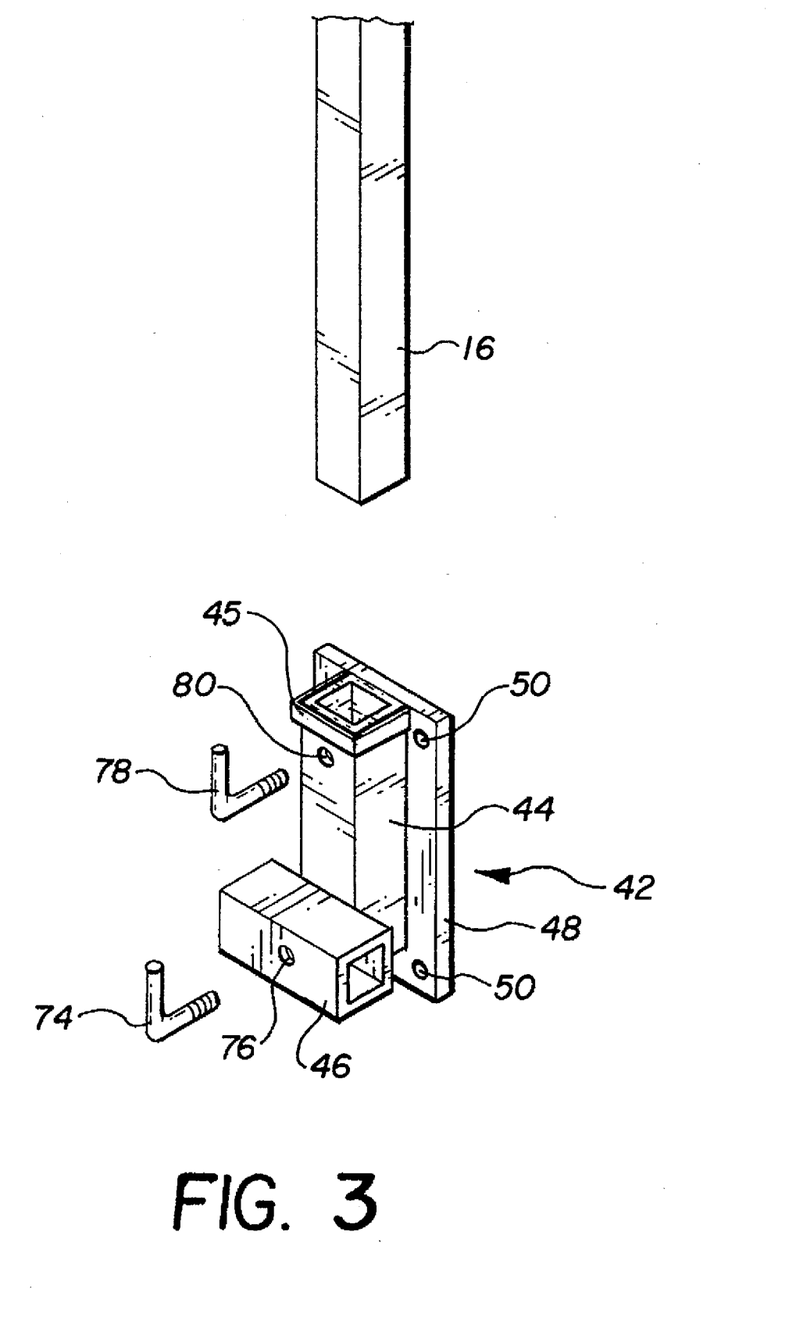
FIG. 3 is a fragmentary exploded view showing the base of the hoist of the present invention.

The hoist 10 is attached to an all terrain vehicle (ATV) 40 by a base 42 attached to the cargo rack of the ATV. The base 42 includes vertical and horizontal shaft sections, 44 and 46 respectively, into which the lower portion 16 of the vertical support shaft 12 can fit. The lower portion 16 of the vertical support shaft 12 is positioned in the vertical shaft section 44 when the hoist of the present invention is being used to hang or lift an animal carcass. With the lower portion 16 of the vertical support shaft 12 inserted in the vertical shaft section 44 the hoist is in the erected or operational state. The lower portion 16 of the vertical support shaft 12 is positioned in the horizontal shaft section 46 when the hoist of the present invention is being stowed for travelling. With the lower portion 16 of the vertical support shaft 12 inserted in the horizontal shaft section 46 the hoist is in the packed or travelling state.

Figure 4:
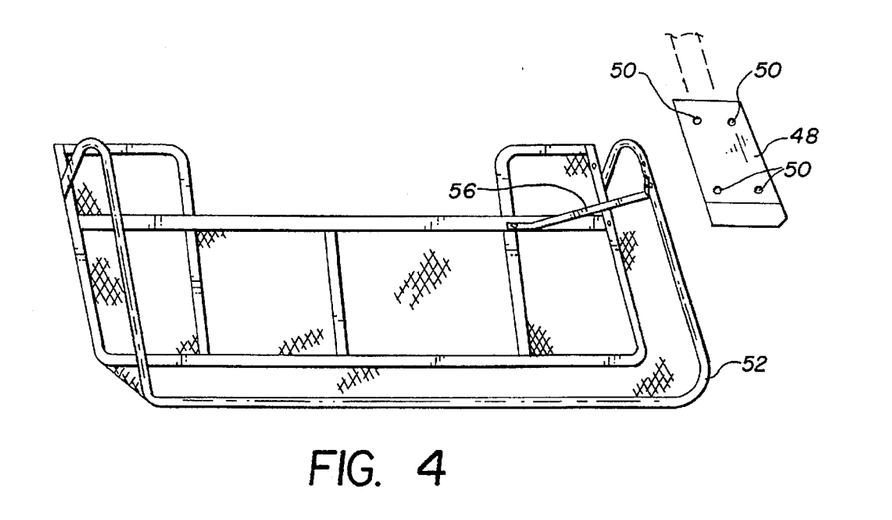
FIG. 4 is a fragmentary view showing the strut used to strengthen the cargo rack of the ATV to which the hoist of the present invention is attached.

The base 42 also includes a support plate 48 to which the vertical shaft section 44 is fixed. The horizontal shaft section 46 is in turn fixed to the vertical shaft section 44 with the longitudinal axis of the horizontal shaft section 46 being perpendicular to the longitudinal axis of the vertical shaft section 44. The support plate 48 has bore holes 50 drilled therethrough to allow the base 42 to be bolted to a portion of the ATV 40. Most preferably the base 42 is attached to the cargo rack of the ATV 40. ATVs such as ATV 40 have cargo racks of two types. These are the extended cargo rack 52, normally found on the back of the ATV, and the regular cargo rack 54, normally found on the front of the ATV. With the rack 52 the base 42 can be bolted directly to the frame of the rack 52. In such an arrangement a strut 56 is preferably bolted to the frame of the rack 52, immediately behind the base 42, to buttress the frame of the rack 52 against collapse.

Figure 5:
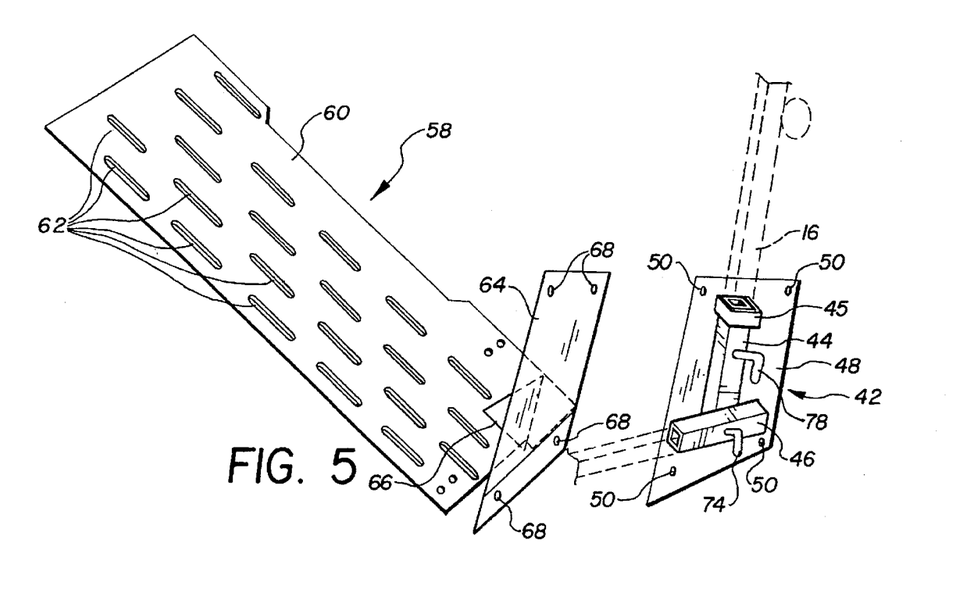
FIG. 5 is a fragmentary exploded view showing the adaptor for attaching the base of the hoist of the present invention to an ATV without an extended cargo rack.

The base 42 can be attached to the regular type rack 54 using an adaptor 58. Adaptor 58 has a base plate 60 which has a plurality of slots 62 drilled therein. The width of the slots 62 is chosen so that the ends of a U-bolt can pass therethrough. Also the length and the spacing of the slots 62 are such that a U-bolt can be secured to the base plate 60 with both its threaded ends going through a single slot 62, or the U-bolt can be secured to the base plate 60 with each of its threaded ends going through a different slot 62. The illustrated arrangement of the slots 62 provides for limitless flexibility in that it allows the base plate 60 to be secured to racks having any conceivable arrangement of frame members. By placing the U-bolts around the members of the frame of the rack 54 and passing the U-bolts's threaded ends through the slots 62, the adaptor 58 can be secured to the rack 54 by tightening down nuts that engage the threaded ends of the U-bolts. The U-bolts, being conventional fasteners, have not been shown in the illustrations. The upright plate 64 is fixedly attached to an end of the base plate 60. The triangular brace 66 gives the attachment of the upright plate 64, to the base plate 60, added rigidity.

The upright plate 64 has through holes 68 which register with holes 50 to allow the base 42 to be bolted to the upright plate 64. Alternatively, the upright plate 64 can have studs attached thereto which register with holes 50 to allow the base 42 to be bolted to the upright plate 64. Once the adaptor 58 has been secured to the rack 54, the base 42 can be bolted to the upright plate 64 thus allowing the attachment of the hoist 10 to racks of the same type as rack 54.

In use the hoist 10 is in the travelling state, shown as item 10a in FIG. 1, while the ATV 40 is on route to or from the hunting site. To place the hoist 10 in the travelling state, the vertical support shaft 12 is shortened as far as possible by inserting upper portion 14 into the lower portion 16 as far as possible. The upper portion 14 is then secured in place by tightening the bolt 70. The bolt 70 threadably engages hole 72, and when tightened the bolt 70 frictionally engages the upper portion 14 to prevent relative movement between the upper portion 14 and the lower portion 16. The bottom end of the lower portion 16 is then inserted into the horizontal shaft section 46 as illustrated, and secured in place by tightening bolt 74. The bolt 74 threadably engages hole 76, and when tightened the bolt 74 frictionally engages the lower portion 16 to prevent relative movement between the lower portion 16 and the horizontal shaft section 46.

When the hoist 10 is to be used for hanging or lifting game, the bolt 74 is loosened and the lower portion 16 is removed from the horizontal shaft section 46. The length of the vertical support shaft 12 is then adjusted to the desired length. This is accomplished by loosening bolt 70 and sliding upper portion 14 out of lower portion 16 until the desired length is reached. The bottom end of the lower portion 16 is then inserted into the vertical shaft section 44 and secured in place by tightening bolt 78. The bolt 78 threadably engages hole 80, and when tightened the bolt 78 frictionally engages the lower portion 16 to prevent relative movement between the lower portion 16 and the vertical shaft section 44. The hoist 10 is now in the erected or operational state.

Tripping the pawl of the winch 26 will allow the cable 32 to be paid out so that the hook 36 can reach the carcass on the ground. The hook 36 can then be used to engage the eye of a gambrel that is itself hooked to the hind legs of the animal. The safety latch 38 prevents hook 36 from slipping out of the eye of the gambrel accidentally. The winch 26 can now be cranked to lift the carcass.

The horizontal and vertical shaft sections 46 and 44, the lower portion 16, and the upper portion 14 are all made of square cross section, hollow tubing. The dimensions of the central channel of the horizontal and vertical shaft sections 46 and 44 are large enough to accommodate the outer dimensions of the lower portion 16. The dimensions of the central channel of the lower portion 16 are in turn large enough to accommodate the outer dimensions of the upper portion 14. A reinforcing collar 17 is provided around the perimeter of the opening through which upper portion 14 passes into the lower portion 16. Also, a reinforcing collar 45 is provided around the perimeter of the opening through which lower portion 16 passes into the vertical shaft section.

It should be apparent from the figures that the hoist 10 can be erected with the boom 18 in any of four different orientations. First the hoist may be erected with the boom 18 extending from the vertical support shaft 12 toward the front of the ATV, second the hoist may be erected with the boom 18 extending from the vertical support shaft 12 toward the rear of the ATV, third the hoist may be erected with the boom 18 extending from the vertical support shaft 12 toward the left side of the ATV, and fourth the hoist may be erected with the boom 18 extending from the vertical support shaft 12 toward the right side of the ATV. The choice of orientation would depend on the desired goal of the user. For example, if it was desired to lift the carcass on to the rack 52, then it may be desirable to erect the hoist 10 with the boom 18 extending from the vertical support shaft 12 toward the left side of the ATV such that the pulley 22 is positioned above the rack 52.

To keep lower portion 16 from sliding within the vertical shaft section 44 under load, the bottom opening of the vertical shaft section 44 can optionally be obstructed by any convenient means. For example, a closure may be welded to the bottom opening of the vertical shaft section 44.

Figure 6:
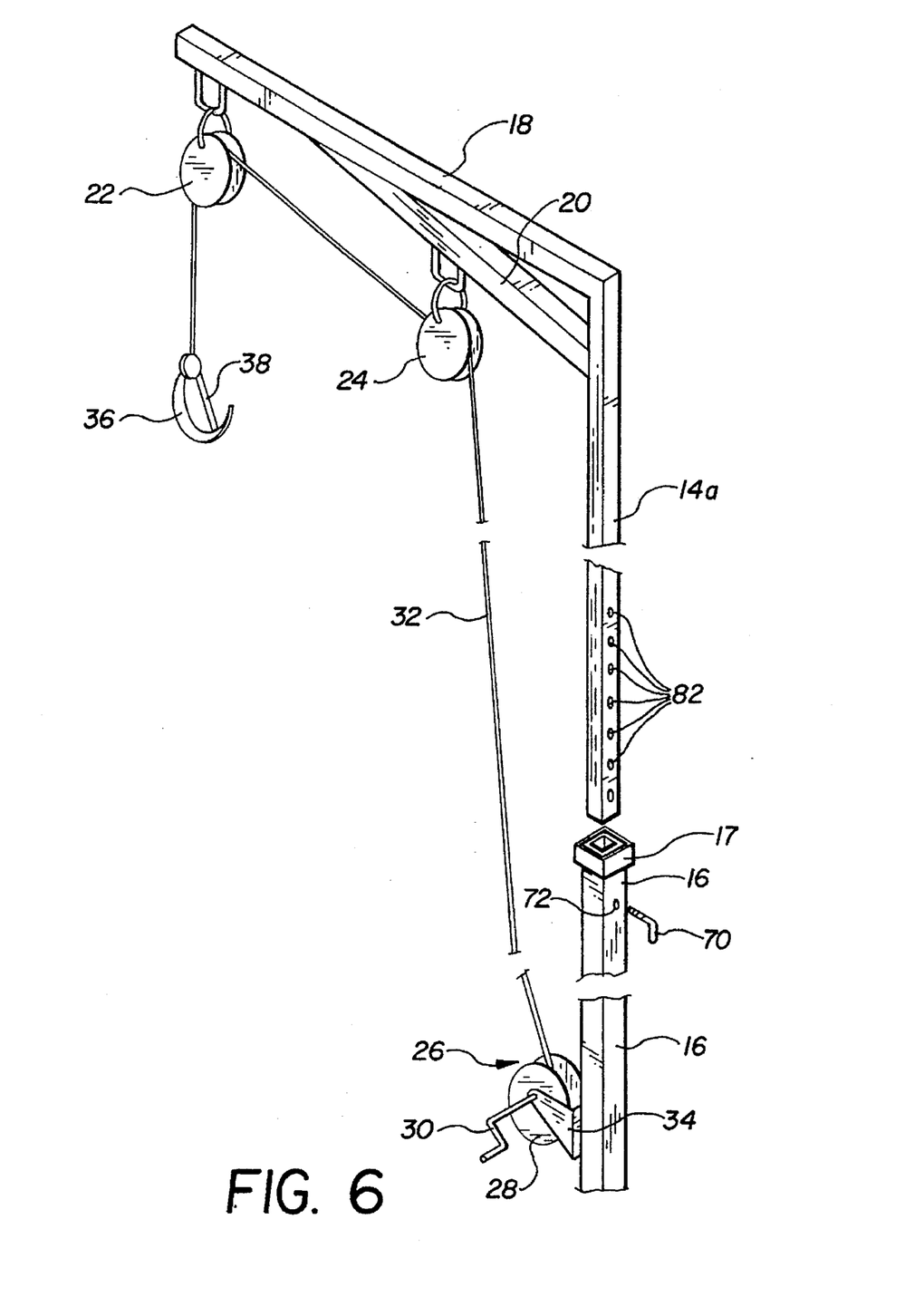
FIG. 6 is a fragmentary exploded view showing the vertical support shaft of a second embodiment of the hoist of the present invention.

Referring to FIG. 6, to more positively prevent the upper portion 14 from sliding within lower portion 16 under load, holes 82 can be provided in upper portion 14 resulting in upper portion 14a. Bolt 70 can then mechanically prevent relative movement between the upper portion 14a and the lower portion 16 when engaging any of the holes 82. In the embodiment of FIG. 6 the bolt 70 and the hole 72 need not be threaded.

Figure 7:
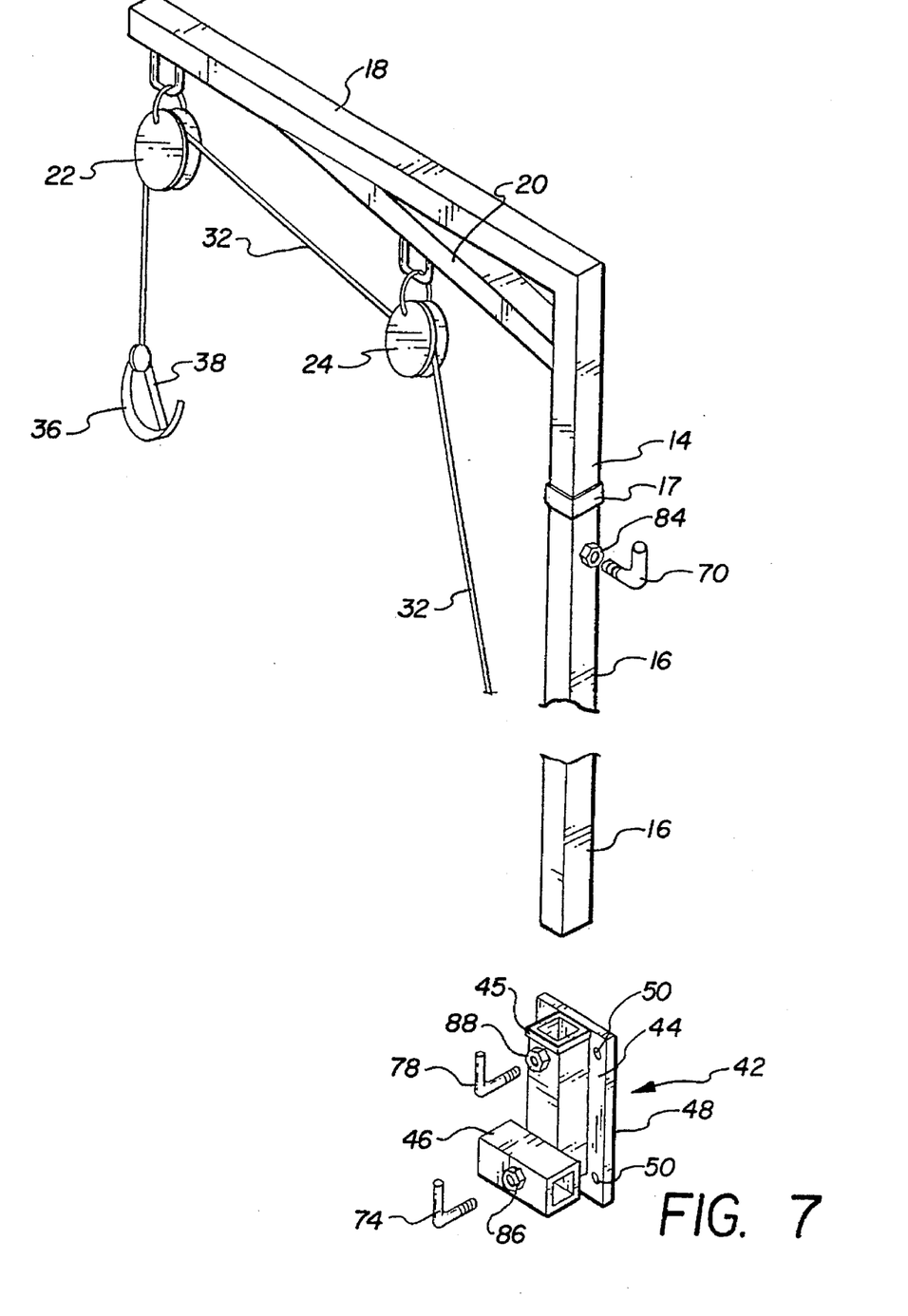
FIG. 7 is an exploded perspective view showing a third embodiment of the hoist of the present invention.

Referring to FIG. 7, another alternative embodiment can be seen. In the embodiment of FIG. 7, rather than threading holes 72, 76, and 80, nuts 84, 86, and 88 are welded over the holes 72, 76, and 80. Bolts 70, 74, and 78 then matingly engage the threads of the nuts 84, 86, and 88 respectively, when secured in position. The embodiment of FIG. 7 is otherwise identical to that of FIGS. 1–5.

One potential problem when lifting very heavy loads with the hoist 10, while it is attached to the ATV, is that ATV may tip over because the moment due to the force exerted by the load at the tip of the boom 18 overcomes the moment due to the center of gravity of the ATV. To remedy this problem, a bracing leg 90 is provided as shown in FIGS. 8–11. the bracing leg 90 has a ground contacting plate 92. The ground contacting plate 92 distributes the load borne by the leg 90 over a wider area of the ground so that the leg 90 does not sink into the ground. Two rectangular fins 94 project from the top of plate 92. Each fin 94 has a through hole 96 (see FIG. 8). The through holes 96 are in registry with one another. The plate 92 is pivotably attached to the end of a telescoping member 98. The telescoping member 98 has a through bore 100 at the end thereof to which the plate 92 attaches. A cylindrical bushing 102 fits into the through bore 100. The outside diameter of the bushing 102 is larger than the diameter of the through holes 96 in the fins 94. The length of the cylindrical bushing 102 is such that the bushing can fit between the fins 94. A bolt 104 goes through the first of the fins 94, the bushing 102, and the second of the fins 94, and is secured on the opposite side of the bolt head by a nut 106. Thus the plate 92 can freely pivot about the longitudinal axis of the bolt 104.

Figure 8:
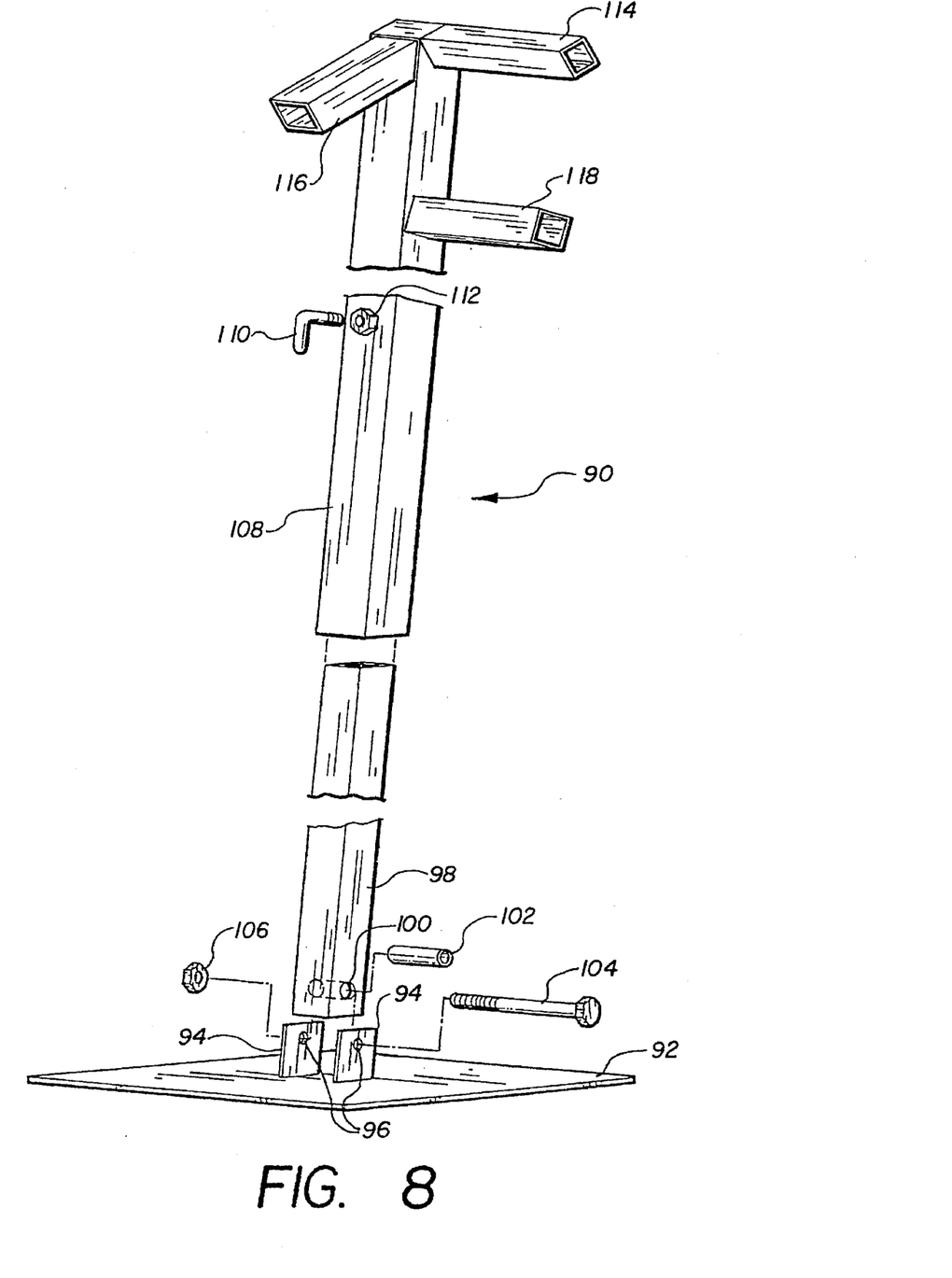
FIG. 8 is an exploded view of the bracing leg used in conjunction with the hoist of the present invention.

The telescoping member 98 fits inside the sleeve member 108. The overall length of the bracing leg 90 is selected by adjusting the amount of penetration of the telescoping member 98 into the sleeve member 108. Once the desired length is reached, the length of the bracing leg 90 is fixed at the selected length by tightening the set screw 110. The set screw 110 engages a nut 112 welded over a hole in the sleeve member 108. This arrangement is used when the wall of the sleeve member is too thin to provide a sufficient length of threading to bear the torque required to tighten the set screw 110.

Figure 9:
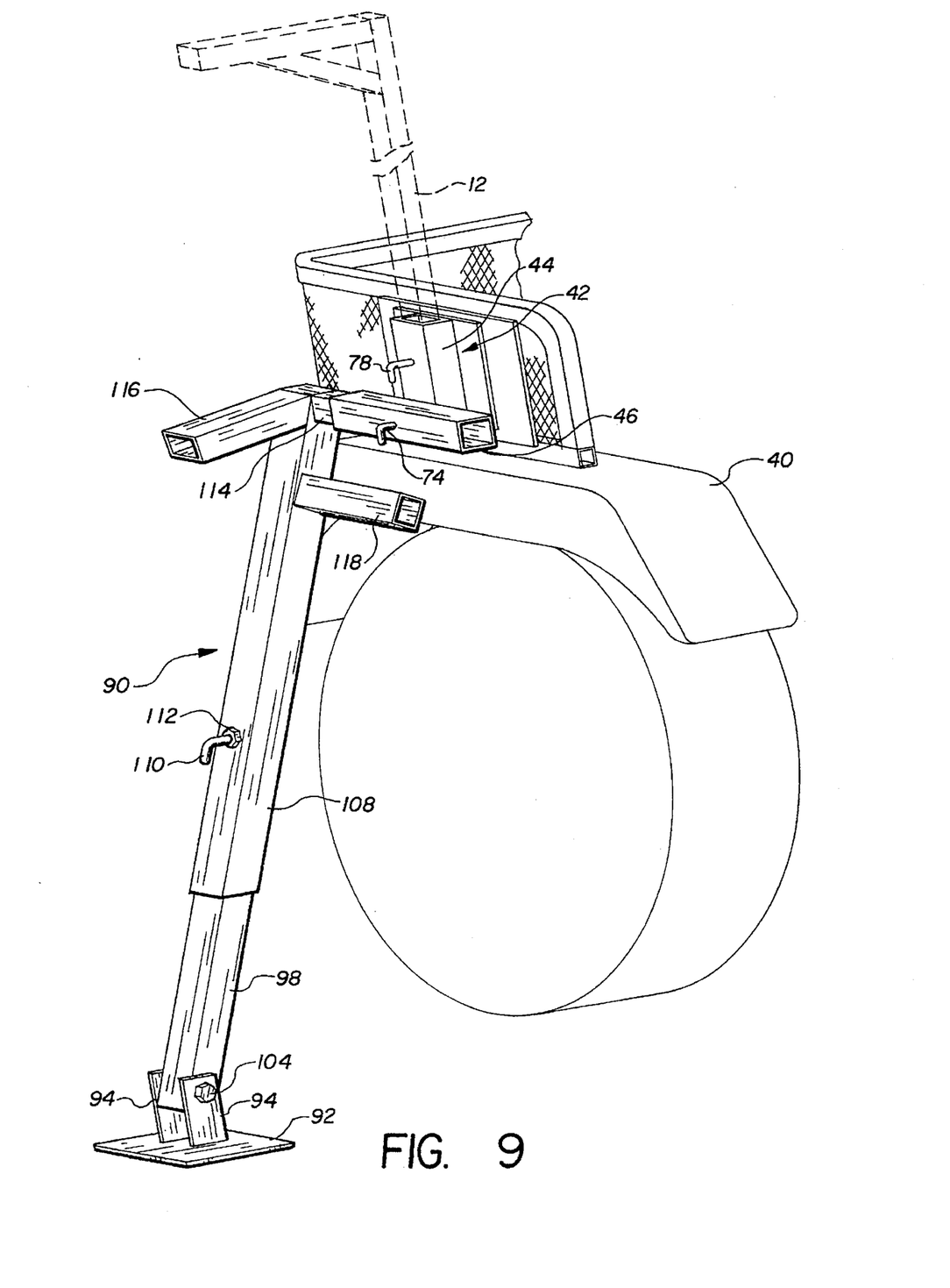
FIG. 9 is an environmental view showing the bracing leg extending toward the ground from the right side of an ATV.

The bracing leg 90 can be attached to the base 42 in a variety of ways using the insertion members 114, 116, and 118. When the hoist 10 is attached to the ATV with the boom 18 projecting out from the right side of the ATV, the insertion member 114 is inserted into the horizontal shaft section 46, from the rear of the horizontal shaft section 46, to thereby position the leg 90 to project from the right side of the ATV. With the leg 90 extended to reach the ground and the set screw 110 tightened, the hoist 10 can be used to lift heavy weights without the ATV tipping over on its right side.

Figure 10:
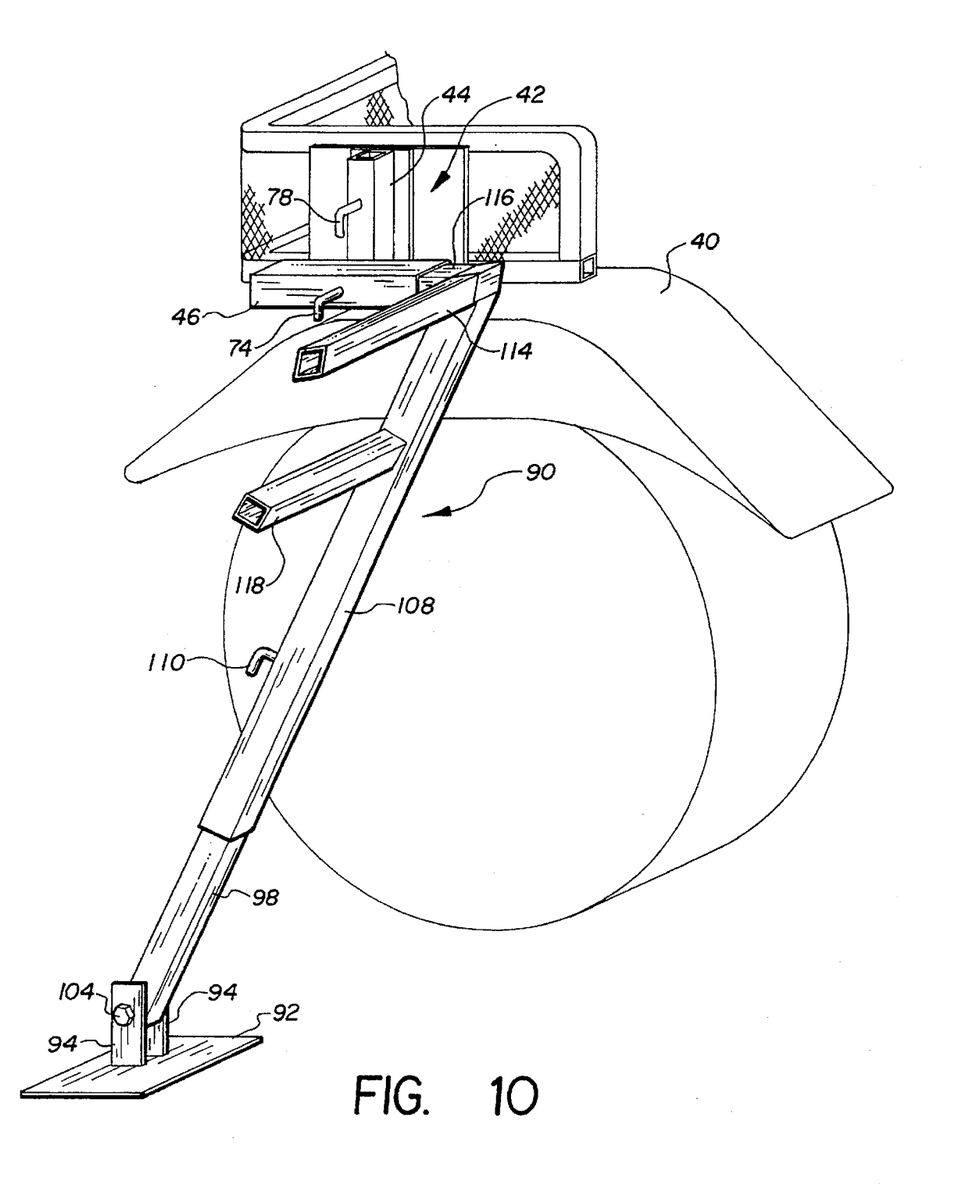
FIG. 10 is an environmental view showing the bracing leg extending toward the rear of an ATV and down to the ground.

When the hoist 10 is attached to the ATV with the boom projecting out from the rear of the ATV, the insertion member 116 is inserted into horizontal shaft section 46, from the front of the horizontal shaft section 46, to thereby position the leg 90 to project from the rear of the ATV. With the leg 90 extended to reach the ground and the set screw 110 tightened, the hoist 10 can be used to lift heavyweights without the front of the ATV pivoting up and the ATV being left standing on its rear.

Figure 11:
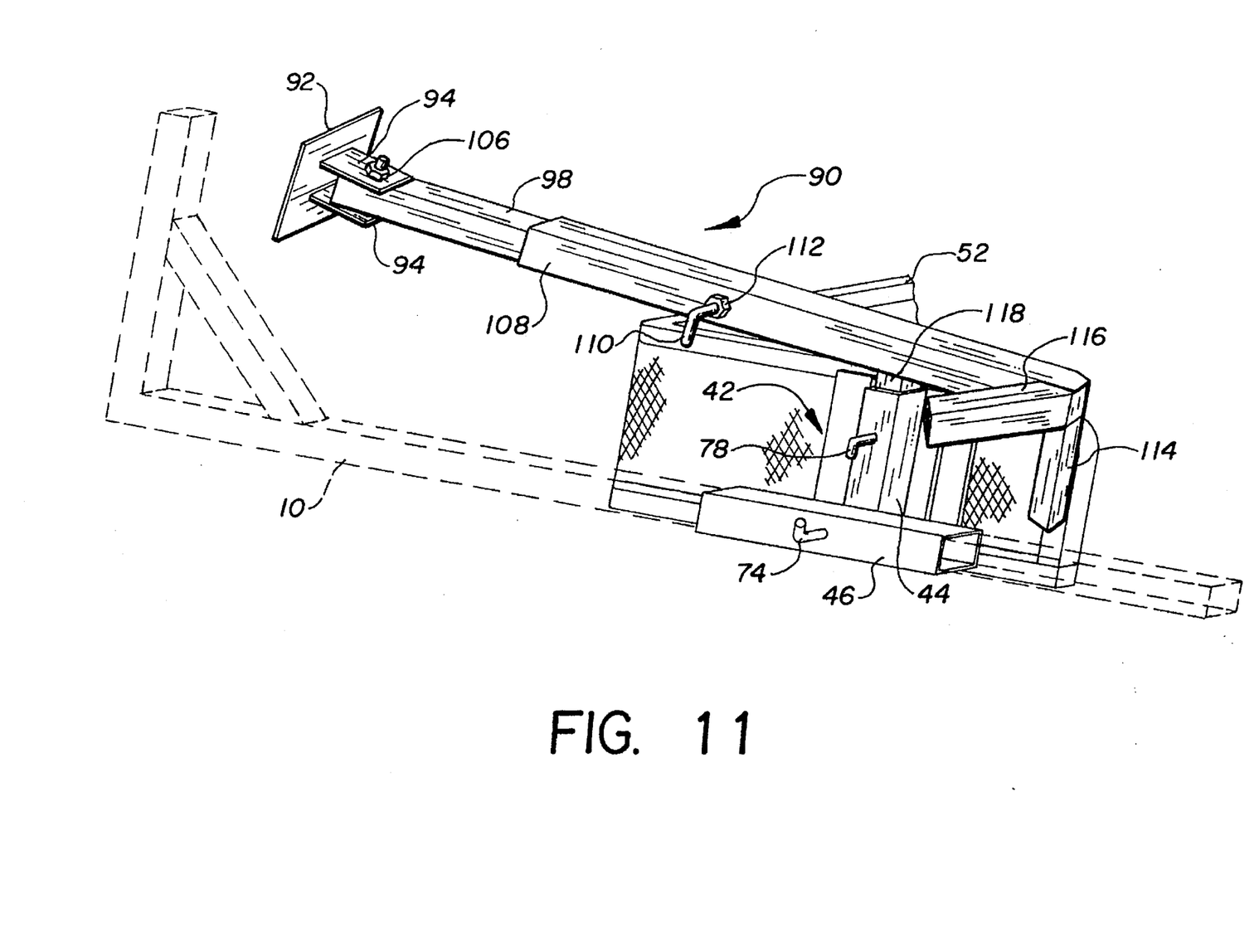
FIG. 11 is an environmental view showing the bracing leg attached to an ATV, in the travelling position.

With the leg 90 secured in the fully collapsed state using the set screw 110 and the insertion member 118 inserted in the vertical shaft section 44, the leg 90 will be in the travelling position illustrated in FIG. 11. Obviously, when any of the insertion members 114, 116, and 118 are inserted into the vertical or horizontal shaft sections 44 and 46, the insertion members are secured in place by tightening a respective one of the bolts 78 and 74. As with the hoist 10, the bracing leg 90 is made of square cross section tubing; the telescoping member 98 being dimensioned to be insertable in the sleeve member 108, and the insertion members 114, 116, and 118 being dimensioned to be insertable in the vertical and horizontal shaft sections 44 and 46.

It is to be understood that the present invention is not limited to the embodiments described above, but encompasses any and all embodiments within the scope of the following claims.

I claim:

1. A hoist for lifting an animal carcass, said hoist being attachable to an all terrain vehicle, said hoist comprising:

a vertical support shaft having a first end and a second end;

a horizontal boom having a first end and a second end, said horizontal boom having said first end fixed to said first end of said vertical support shaft;

a pulley provided at said second end of said horizontal boom;

a winch attached to said vertical support shaft;

a cable wound around said winch and routed around said pulley for allowing the carcass to be suspended below said second end of said horizontal boom; and a base attachable to the all terrain vehicle, said base having a vertical hollow shaft section and a horizontal hollow shaft section, each said section selectively receiving said second end of said vertical support shaft, said vertical hollow shaft section for deploying said hoist and said horizontal hollow shaft section for storing said hoist, each said section having a substantially similar cross-section.

2. The hoist according to claim 1, wherein said base further includes a vertical support plate, said vertical hollow shaft section being fixed to said vertical support plate and said horizontal hollow shaft section being fixed to said vertical shaft section opposite said vertical support plate.

3. The hoist according to claim 1, wherein said vertical support shaft is telescoping.

4. The hoist according to claim 1, wherein said hoist further includes a bracing leg, said bracing leg comprising:

a bracing leg support shaft having a first end and an opposing second end;

a first insertion member extending laterally from said second end of said bracing leg support shaft for inserting into said horizontal hollow shaft section;

a second insertion member extending laterally from said second end of said bracing leg support shaft for inserting into said horizontal hollow shaft section; and a third insertion member extending laterally from said bracing leg support shaft proximate said first insertion member for inserting into said vertical hollow shaft section.

5. The hoist according to claim 4, wherein said bracing leg support shaft includes a telescoping member slidably supported within a sleeve member.

6. The hoist according to claim 5, wherein said sleeve member has a wall defining an opening and a set screw threadedly supported to pass through said opening.

7. The hoist according to claim 4, wherein said first end of said bracing leg support shaft has a ground contacting plate pivotably attached thereto.

* * * * *